Figure 1:
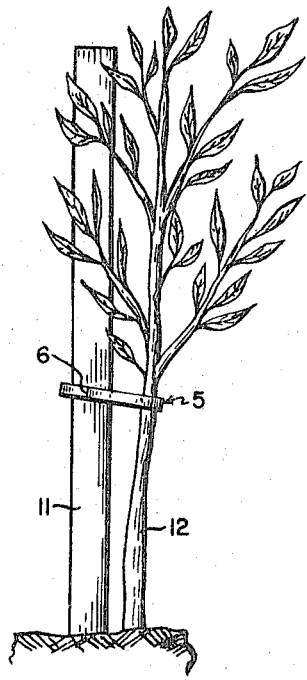

June 13, 1967 — L. J. PRENNER ET AL — 3,324,592
PLANT SUPPORT

Filed Dec. 27, 1965 — 3 Sheets-Sheet 1

INVENTORS.
LOUIS J. PRENNER
MILTON PRENNER
BY James N. Cyles
ATTORNEY

INVENTORS
LOUIS J. PRENNER
MILTON PRENNER

United States Patent Office 3,324,592
Patented June 13, 1967

3,324,592
PLANT SUPPORT
Louis J. Prenner and Milton Prenner, both of
P.O. Box 1446, Pompano Beach, Fla. 33061
Filed Dec. 27, 1965, Ser. No. 517,515
5 Claims. (Cl. 47—47)

This invention relates to a support for supporting relatively tender plants against a ground stake and has for its object to provide an expandable band of molded plastic material that may be engaged around the plant and the stake.

The invention contemplates a molded supporting element of generally arcuate form that has overlapping ends to permit the support to be expanded for engagement around the stake and the plant and expandable as the plant grows and with the device being provided with hooks at its opposite ends to prevent the support from expanding beyond the scope of the plant and also provided with serrations adjacent each end to engage the plant or the stake to prevent the support from falling downwardly.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
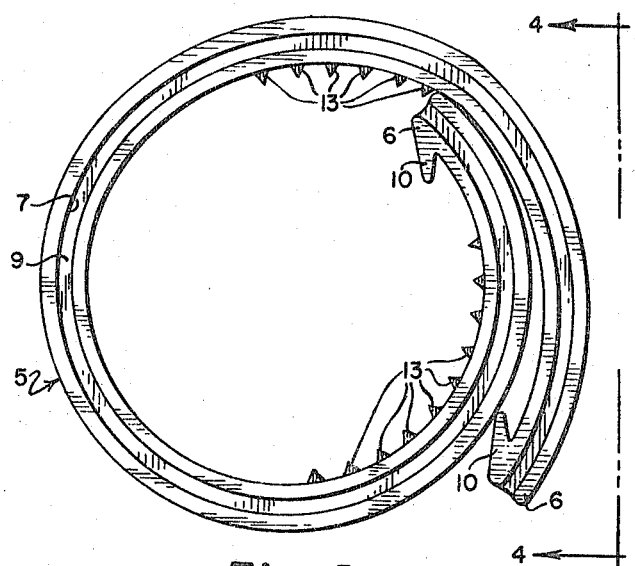
Figure 5:
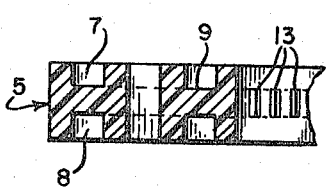
Figure 3:
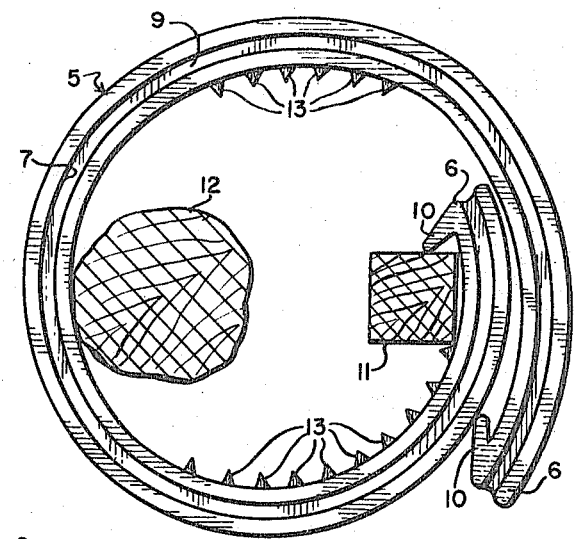
Figure 4:
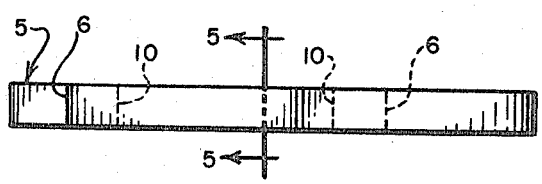
Figure 7:
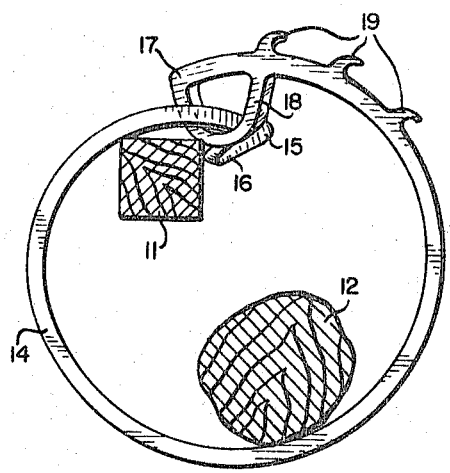
Figure 6:
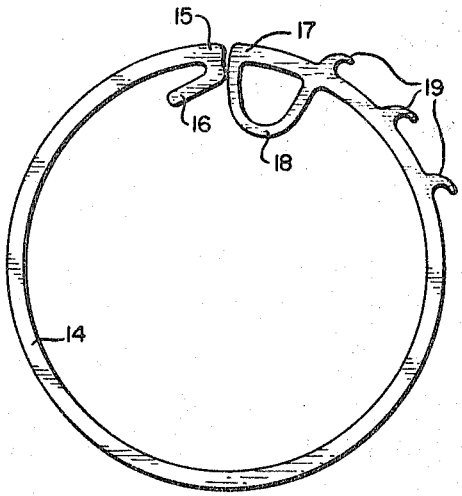
Figure 8:
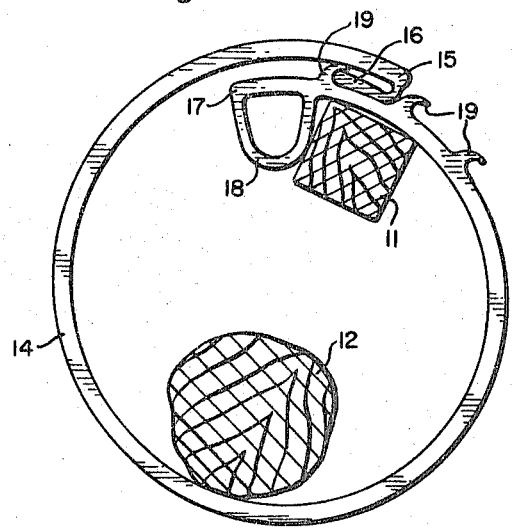
Figure 9:
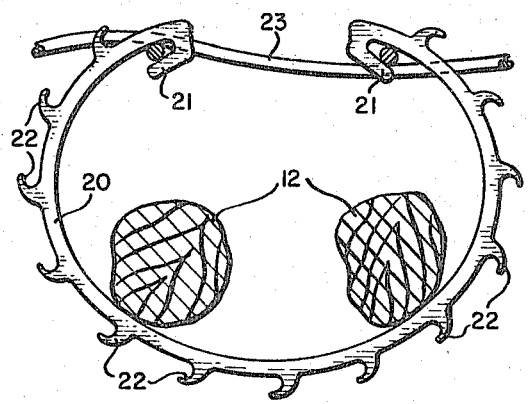
Figure 10:
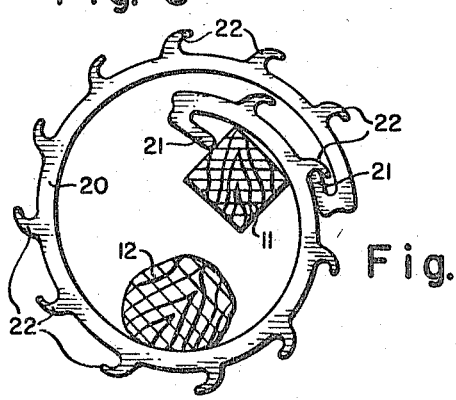
Figure 11:
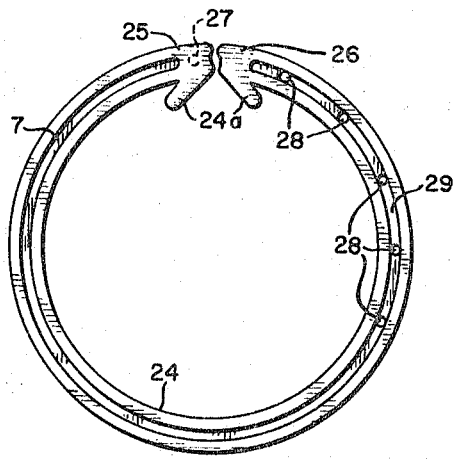
Figure 12:
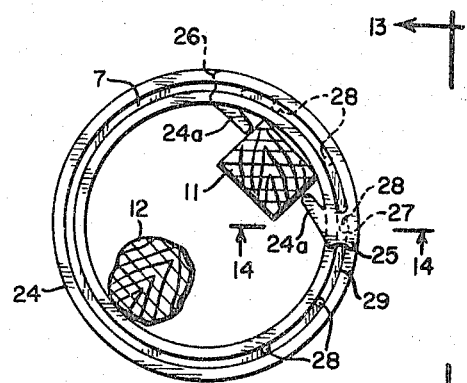
Figure 13:
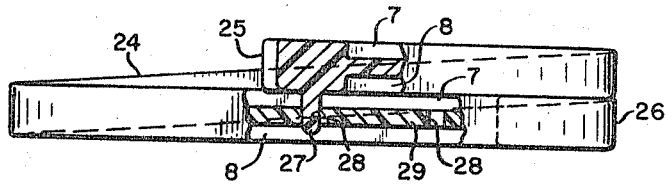
Figure 14:
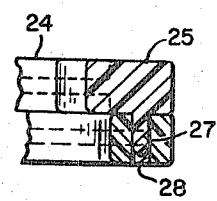
Figure 15:
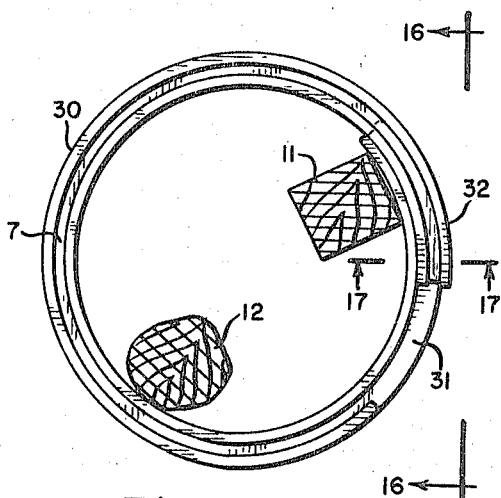
Figure 16:
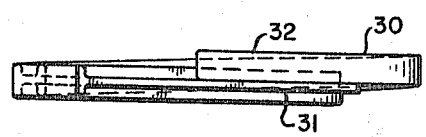
Figure 17:
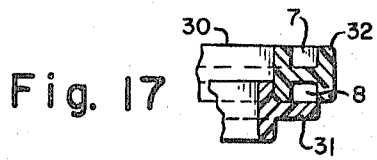

In the drawings:

FIGURE 1 is a side elevation of a ground stake and a plant, having the invention applied thereto, FIGURE 2 is a plan view of the device, FIGURE 3 is a view similar to FIGURE 2 and showing the support relative to the plant and the supporting stake, FIGURE 4 is an edge view of the device taken substantially on line 4—4 of FIGURE 2, FIGURE 5 is a section taken substantially on line 5—5 of FIGURE 4, FIGURE 6 is a plan view of a modified form of the device, FIGURE 7 is a similar view but with the holder being mounted upon a supporting stake and a plant, FIGURE 8 is a view similar to FIGURE 7 but illustrating a different hooking means for the ends of the device, FIGURE 9 illustrates a plant holder as mounted upon a supporting wire, FIGURE 10 illustrates the device as shown in FIGURE 9 in a contracted position with respect to a stake and a plant, FIGURE 11 is a further modified form of plant holder, FIGURE 12 is a view similar to FIGURE 11 but with the holder in a contracted position around a stake and a plant, FIGURE 13 is a side elevation of a plant holder in adjusted contracted position and illustrating the device of FIGURE 12, parts being broken away, FIGURE 14 is a section taken substantially on line 14—14 of FIGURE 12, FIGURE 15 is a top plan view of a further modified form of plant holder, FIGURE 16 is an edge view of the device illustrated in FIGURE 15 and taken substantially on line 16—16, and FIGURE 17 is a section taken substantially on line 17—17 of FIGURE 15.

Referring specifically to the drawings, there has been provided a molded plastic band 5, having its ends 6 in overlapping relation. The band 5, as shown clearly in FIGURE 5 is molded in an H-shape cross-section by providing upper and lower circumferential grooves 7 and 8 and intermediate the grooves 7 and 8 there is a connecting wall 9. The ends of the end portions 6 are provided with hooks 10, one of which functions to engage the supporting stake 11 as shown in FIG. 3 when the device is expanded and under the influence of the expanding of the diameter of the plant 12.

The band, as clearly shown is provided with rows of serrations 13 that also constitute frictional means whereby to prevent the dropping downwardly of the support 5. The device, including the band 5, the hooks 10 and the serrations 13, are all molded in a conventional manner and are expandable during the use of the device.

In use, the band 5 has its ends 6 expanded outwardly so as to engage the band around both the stake 11 and the plant 12 and when released, will contract to grip the stake and also the serrations 13 engage the stake and prevent the device from dropping downwardly from its point of engagement with the stake and the plant. As the plant grows, it will expand in diameter and the band 5 will also expand and when such expansion occurs, the inner hook 10 will engage upon the stake 11, as shown in FIGURE 3 and permit further expansion upon the outer end portion 6 to securely hold the plant in an upright position in all conditions of weather. After the plant has fully matured, the band may be removed and used over and over for additional plantings.

Referring now to FIGURE 6, there has been provided a circular band 14 that is formed of molded plastic, metal or the like and with one end 15 being provided with an inwardly extending hook 16. The opposite end 17 terminates in an inwardly extending loop 18 and a plurality of hooks 19 extend around the device from the end 17 and constitute engaging means for the hook 16 in the contraction of the device. In this form of the device, the band 14 is adapted to be expanded sufficiently to engage around the plant 12 and the stake 11 and the hook 16 may be engaged through the loop 18 or the hook may engage either one of the outer hooks 19 to hold the device in a contracted position. FIGURE 8 illustrates the device of this modification as showing the hook 16 extending in overlying relation to the end 17 and engaging one of the hooks 19.

In FIGURE 9, there has been illustrated a further modified form of the device wherein an expandable and contractable band 20 overlies the plants 12 and the stake 11 and the band in this instance is also formed of either a molded plastic or a metallic spring-like structure adapted to automatically contract after the device has been expanded in engagement around the plant and the stake. The band 20 at its opposite ends is provided with inwardly directed hooks 21 and the outer circumference of the band 20 is also provided with outwardly extending hooks 22. As in FIGURE 9, the device is engaged with a wire support 23, where the expansion of the device does not permit the engagement of the opposite ends of the loop. In FIGURE 10, the same construction as shown in FIGURE 9 has been illustrated, including the band 20, the hooks 21 and the outer hooks 22, permitting the device to be engaged around a plant and a stake and to permit the hooks 21 to engage either one of the hooks 22 in the contracted manner.

In FIGURE 11, there has been provided a modified form of plant holder embodying a band 24, having its ends provided with hooks 24a. In this particular instance, one end portion 25 is adapted to be twisted and overlie the opposite end 26 of the band 24 and the end 25 carries a pin 27 that is adapted to be engaged into any selected one of a plurality of apertures 28, formed in the bottom wall 29 of the upper and lower grooves 7 and 8. The band can thus be contracted around the stake and the plant by merely overlapping one end of the band 24 and contracting the band to engage either one of the apertures 28 for effectively holding the band in a contracted band sufficiently tight around the stake and the plant.

In FIGURE 15, there has been illustrated a further modified form of the invention wherein the band 30 is provided with the grooves 7 and 8. In this form of the invention, upper and lower flanges upon the outer periphery of one end portion of the band have been removed, leaving a flat wall section 31 that projects outwardly from the periphery of the band and permits the opposite arm 32 to be engaged over the flat wall section 31 and permits the expansion and contraction of the band without benefit of hooks or apertures.

In use, with respect to the modified forms illustrated in FIGURES 6–17, the band is stretched to an open position and clipped around the stake and the plant and when released, will contract to securely hold the plant with respect to the stake or the wire 23 illustrated in FIGURE 9.

It is to be understood that the invention is not limited to the precise construction shown, but that changes are contemplated as readily fall within the spirit of the invention as shall be determined by the scope of the subjoined claims.

We claim:

1. An expandable and contractable plant support for engaging a ground stake and supporting a plant, said support comprising a molded band having free, overlapped ends, a hook formed at each of said ends and directed inwardly of the band, the band being adapted to encircle a plant and the supporting stake therefor, one of the hooks being engageable against the stake when the band becomes fully expanded, the band being provided on its inner face with a plurality of inwardly-directed serrations that prevent the band from slipping downwardly with respect to the plant and the stake and the band is molded of plastic and with the band having flat upper and lower surfaces and with the surfaces being circumferentially grooved to permit the expansion and contraction of the band, the serrations being relatively short and spaced apart and extending around the inner surface of the band adjacent to each of the overlapping ends.

2. A plant support of the character described for supporting a growing plant in an upright manner adjacent to a fixed ground stake, comprising a cylindrical band of yieldable material that is separated at a point in its diameter to present end portions, the end portions being provided with integral oppositely directed hooks, one end portion being provided with a downwardly extending pin and the other end portion being provided with a plurality of apertures, the ends adapted to be overlapped and with the pin of one end portion engaging a selected aperture of the other end portion to retain the holder in a contracted position, the support being expandable and contractable whereby the support will engage around the plant and the stake and be retracted to maintain the plant in a predetermined spaced relation to the stake.

3. The structure according to claim 2 wherein the band is molded of a suitable material that is expandable and retractable at all positions of the end portions.

4. The structure according to claim 2 wherein the band is molded of a plastic material calculated to withstand the exposure to the sun and the wind and will maintain its resiliency throughout its use.

5. The structure according to claim 2 wherein the band is substantially square in cross section and having a flat upper and lower surface, the upper and lower surfaces being grooved and with the bottom of the groove being provided with the apertures.

References Cited

UNITED STATES PATENTS

| 2,174,955 | 10/1939 | Wade | 47—47 |
|---|---|---|---|
| 2,551,384 | 5/1951 | Middleton et al. | |

FOREIGN PATENTS

| 18,306 | 1905 | Great Britain. |
|---|---|---|
| 252,673 | 7/1948 | Switzerland. |
| 354,979 | 7/1961 | Switzerland. |

ABRAHAM G. STONE, *Primary Examiner.*

ANTONIO F. GUIDA, R. CARTER,
*Assistant Examiners.*